United States Patent [19]

Doundoulakis

[11] 4,167,922

[45] Sep. 18, 1979

[54] INTERNAL BALLISTIC ENGINE

[76] Inventor: George J. Doundoulakis, 2498 Kayron La., North Bellmore, N.Y. 11710

[21] Appl. No.: 828,090

[22] Filed: Aug. 26, 1977

[51] Int. Cl.$^2$ .................. F02B 53/00; F02B 71/00
[52] U.S. Cl. ................................ 123/46 R; 123/245
[58] Field of Search ............. 123/46 R, 46 B, 46 H, 123/51 R, 51 A, 51 AA, 245

[56] References Cited

U.S. PATENT DOCUMENTS

| 1,353,099 | 9/1920 | Wales | 123/46 X |
| 3,066,476 | 12/1962 | Conrad | 123/46 R X |

FOREIGN PATENT DOCUMENTS

| 1144055 | 2/1963 | Fed. Rep. of Germany | 123/46 R |
| 2223660 | 12/1973 | Fed. Rep. of Germany | 123/46 R |

Primary Examiner—Carlton R. Croyle
Assistant Examiner—Michael Koczo, Jr.
Attorney, Agent, or Firm—Constantine A. Michalos; Peter C. Michalos

[57] ABSTRACT

An internal ballistic engine for providing high thermal efficiency comprising a housing, a powering chamber, a ballistic piston, not directly engaged with the output shaft in the state of motion of the piston, primarily depending on its mass moment of inertia and the internal forces provided by the powering chamber, this piston is disposed in, and movable in the powering chamber, for accumulating a substantial portion of the internal energy in the powering chamber as kinetic energy in conjunction with its mass moment of inertia, such transfer of energy causing the temperature and pressure in the powering chamber to be drastically reduced, therefore lowering the rate of loss of heat to the walls; a second chamber, in tandem with the powering chamber, so that the second chamber is being compressed as the powering chamber is being expanded, whereby the kinetic energy accumulated on the ballistic piston is being converted into potential energy temporarily stored in the second chamber; means of interaction between the second chamber and the output shaft whereby rotational driving energy is being transferred to the output shaft. Holding and release means are provided for controlling the compression ratio as a result of the motion of the ballistic piston inside the powering chamber, in terms of the amount of fuel flowing into the engine for further optimum of the thermal efficiency of the engine.

18 Claims, 8 Drawing Figures

INTERNAL BALLISTIC ENGINE

BACKGROUND OF THE INVENTION

1. Field of the Invention

This invention relates in general to engines for converting energy into torque and particularly to a new and useful internal ballistic engine which incorporates an internal ballistic piston for accumulating a portion of the internal energy as kinetic energy and an energy accumulating chamber for momentarily accumulating the kinetic energy of the piston in the form of potential energy and releasing the energy to produce a torque on a shaft.

2. Description of the Prior Art

One of the most widely used engines for converting energy into a usable torque is of the internal combustion type which utilizes a cylinder having a closed end with one or more valves adjacent the closed end and having a reciprocating piston within the cylinder. Combustible fluid and air is injected or drawn into the cylinder space above the piston and then compressed. After compression the fluid and air are caused to ignite, either through the use of a spark plug or, in the case of a diesel engine, by the heat produced in the compression stroke and work is produced when the piston is forced downward in the cylinder due to the expanding gases which are products of combustion from the fluid and air mixture.

The piston is in general connected to a rotating crankshaft which is given torque by the action of the pressure inside the cylinder. During combustion of the fuel, which in the conventional piston engines may last for a few degrees of rotation of the crankshaft at low engine speed to over 50 degrees of rotation at high speeds, the gases inside the cylinder above the piston become highly energized due to the combustion process.

The temperature and pressure of the gases increase to a value greatly above the ambient conditions around the cylinder. Gas temperatures on the order of 5,000 degrees coupled with pressures of about 1,000 psi are usual. Due to the high differential between the energy states within the cylinder and outside the cylinder substantial loss of energy occurs in the form of heat flowing from the hot gases to the cylinder wall. This heat is eventually lost to the cooling system which is provided for this purpose. This loss of heat lowers the temperature and pressure of the hot gases and therefore reduces the amount of available work which can be provided to the crankshaft.

Concurrently with this loss of energy, the motion of the piston during expansion corresponds to an increase in the volume of hot gases. This volume increase represents work transferred by the gases to the piston. The amount of work done, measured in foot-pounds, is equal to the products of the volume increase multiplied by the pressure of the gases at the time of this increase. Performance of this work represents a conversion of heat energy into mechanical energy and as the expanding gases do this work, their temperature and pressure is further lowered. The energy thus dissipated in each of the above processes will diminish the rate at which the other process dissipates its energy.

Because of the nearly sinusoidal motion of the pistons in the conventional piston engines, due to their direct engagement with the crankshaft, the pistons move at relatively low velocity while in the vicinity of TDC (Top Dead Center), while the temperature of the gas inside the cylinder remains high. As the heat losses to the wall of the cylinder are proportional to the difference in temperature between gas and wall and also proportional to the time the piston stays around TDC, the heat losses in the conventional piston engines, due to conduction and radiation, while the piston remains in the vicinity of TDC are high. It has been shown using a computer that at 1000 r.p.m. as much as 35% of the heat in the fuel can be lost to the wall of the cylinder while the piston remains within $\pm 15°$ from TDC.

It is apparent that if the piston is allowed to move freely, especially during the early phase of expansion in the gases, the fast expansion of the chamber would cause quick reduction of temperature and pressure resulting in a lower amount of heat lost by conduction through the chamber walls and therefore allowing a larger amount of thermal energy to be available for providing the useful work. When the piston is freed from direct engagement with the crankshaft, its motion is determined in accordance with ballistic principles based on its mass and the forces applied to it. A gun, for example, representing the most rudimentary form of internal combustion engine, converts heat into work with a very high degree of thermal efficiency because the bullet in the barrel is free to accelerate, being restricted only by its own mass and friction with the barrel wall. The motion of the bullet conforms to ballistic principles. The gun, in effect, corresponds to an engine having an exceedingly high compression ratio, allowing more energy to be converted into work before the bullet leaves the barrel.

The compression ratio of an internal combustion engine is the largest volume of the combustion chamber divided by the smallest volume of the combustion chamber as determined by the moving piston therein, for example, as in the case of a bullet in the barrel, the volume of the barrel divided by the volume of the bullet casing containing propellant. This ratio is indicative of thermal efficiency also in all internal combustion engines.

The conventional engines can be designed to operate with compression ratios around 8.5:1. At higher compression ratios and despite the high octane fuels used, detonation of the fuel mixture takes place, known as "knocking." During detonation the velocity of the flame front is greatly increased causing almost instantaneous conversion of the fuel to heat. As the piston is moving very slowly at TDC the heat loss to the walls of the combustion chamber is sharply increased with the likelihood of severe damage to the piston, the heat dissipation of which is limited. In the engine providing a ballistic piston, according to the present invention, quick expansion of the combustion chamber quickly reduces the temperature of the gas in the chamber, thus lowering the rate of heat loss so that even detonation of the gas will have no harmful effect on the engine. The internal ballistic engine will be able to operate at higher compression ratios, a property which will further increase the thermal efficiency of engines. Another consequence of the quick expansion of the combustion chamber via a ballistic piston is the facility of using highly flammable low octane fuels for increasing the rate of burning of the fuel around TDC for greater thermal efficiency.

SUMMARY OF THE INVENTION

The concept of an internal ballistic engine can best be explained by use of a simplified embodiment which is based upon the standard piston engine. A ballistic engine would comprise a circular cylinder having one reciprocating piston or reaction member therein, connected to a crankshaft as shown in FIG. 2 as hereinafter more fully described. Spaced from the reciprocating piston or reaction member is a free moving double piston which is free to move in the space above the reciprocating piston in the cylinder.

The work "double" implies that the free piston is assumed to have rigidly attached to it and axially extending a sliding wall through the combustion chamber dividing the cylindrical space above into two distinct combustion chambers. These chambers are operated so that while one chamber is in the power stroke of the Otto cycle the other is in the intake stroke.

The cylinder space between the reciprocating and double piston defines a cavity or energy accumulating chamber which can be filled with a compressible medium such as air. The space above the free moving double piston, thus defines the combustion chambers of the cylinder. Intake and exhaust valves and ports as well as spark plugs are provided for each combustion chamber. An extension of the sliding wall, attached to the free moving piston, projects beyond the end of the cylinder and is provided with a ratchet and pawl mechanism.

In operation, when the free moving piston is in its extreme upper position, one of the chambers which had previously been filled with a gas/air mixture for combustion is ready for the power stroke of a standard Otto cycle. When the air/gas mixture is ignited by the spark plug in one of the chambers, the free moving piston is forced downwardly towards the reciprocating piston. The energy provided by the quick expansion of the combustion chamber, which is equal to the change in volume multiplied by the average pressure of the combustion chamber, is being converted into kinetic energy and is accumulated on the ballistic piston and wall. As the ballistic piston is moving towards the reciprocating piston, its kinetic energy is expanded in compressing the "energy accumulating chamber," whereby the kinetic energy of the ballistic piston is being converted into potential energy in the energy accumulating chamber. The pressure in the accumulating chamber drives the piston which is connected to the crankshaft outwardly imparting torque to the crankshaft.

When the free moving piston is moved by the expanding gases to its lowest position in the cylinder, a pawl and ratchet mechanism engages the free moving piston projection and momentarily holds the free moving piston down toward the reciprocating piston and against the pressure of the air in the energy accumulating chamber.

As the free moving double piston moves downwardly in the cylinder, the second chamber is in its suction stage of the Otto cycle and is supplied with air and fuel through the intake port. When the reciprocating piston, as is driven by the crankshaft, begins its climb in the cylinder, the pawl and ratchet mechanism is released through an interlinking mechanism, at a predetermined instant, allowing the free moving piston to again rise in the cylinder under the action of compressed air in the energy accumulating chamber caused by the rising reciprocating piston and energy derived from the crankshaft. The rising free moving piston then causes the first combustion chamber to go through its exhaust stroke of the Otto cycle and its second chamber to execute its compression stroke. At this point, the simplified internal ballistic engine is ready for a second power stroke from the second combustion chamber.

It will be appreciated that the motion of the free moving piston in the above simplified internal ballistic engine is determined by its mass, the energy imparted to it by combustion in either of its two combustion chambers and the volume and pressure characteristic of the air within the energy accumulating chamber. While such an engine described is not necessarily suitable for use as a car engine, for example, it serves to illustrate the principles involved in the concept of a ballistic engine. In summary, the operation and features of the engine are as follows:

Upon ignition of the fuel a portion of the internal energy in the combustion chamber is imparted as kinetic energy on the free piston. The kinetic energy is subsequently converted into potential energy into an energy accumulator chamber which can be considered in tandem with the combustion chamber. Some of the potential energy stored in the energy accumulator chamber is being transferred on to the crankshaft as useful work, the balance is used for accelerating the ballistic piston.

Compression of the new fuel/air mixture is then accomplished by using the kinetic energy of the free moving or ballistic piston as it moves upwardly in the cylinder. The free moving or ballistic piston is accelerated by pressure which is built up in the energy accumulating chamber as the reciprocating piston, which is directly connected to the crankshaft, approaches it.

Previously, the ballistic piston is prevented from moving away from the reciprocating piston by a special releasing mechanism, for example, the pawl and ratchet mechanism. The amount of pressure between the two pistons, and therefore the energy with which the ballistic piston will be forced upward within the cylinder, will depend on their proximity at the time of the release device being actuated. The energy for this pressure is derived from the potential energy stored in the energy accumulating chamber and from the flywheel action of the crankshaft.

The minimum volume which will be attained in the combustion chamber will be a function of both the amount of gas mixture in the chamber and the kinetic energy in the compressing ballistic piston. The compression ratio therefore can be adjusted by controlling the proximity of the two pistons at the time of release, to be a function of the fuel charge going into the combustion chamber. This in turn can be controlled by an accelerator pedal in the car using such an internal ballistic engine.

Ignition of the fuel may be accomplished by the spark plug or by high compression, or both. The piston being free to move will be cushioned on the high pressure of the combustion fuel mixture and will start moving freely away from the end of the cylinder so that most of the energy of combustion will be converted into kinetic energy in the free moving or ballistic piston. As the free moving piston moves toward the second piston, substantial force is imparted to the second piston and to the crankshaft. The balance of its kinetic energy is converted into potential energy stored in the energy accumulating chamber. This energy will be used during the next stroke and toward the compression of a new fuel mixture.

The advantages of the internal ballistic engine using a ballistic piston are as follows:

The high rate of conversion of energy to work at the beginning of expansion of the combustion gases causes both temperature and pressure in the combustion chamber to be reduced rapidly. The rate of heat loss to the cooling system therefore is quickly diminished.

The fuel at high compression is being ignited in the early parts of the stroke so that the resulting pressure can be used more efficiently. In addition, the fuel may be ignited and even detonated at any time during compression, without damage to the engine or the possibility of backfiring in the system.

Since expansion, and therefore reduction in both temperature and pressure, is accomplished at extremely high rates and against the free piston, detonation of the fuel will not be as harmful to the engine wall as it would be in the case of conventional piston engines. In such a case, or with the use of proper materials which can withstand the shock waves generated by detonation, detonation can actually be designed as the normal process of combustion in the engine. The engine then can operate with any low-grade highly flammable gasoline. Thus the use of low octane or gasoline without anti-knocking additives is possible.

Because of the high compression that this engine can provide, leaner mixtures of fuel can be used, further increasing the fuel efficiency. Leaner mixtures with more air may permit more complete burning of the hydrocarbons and substantially reduce objectionable carbon monoxide. A smaller amount of oxides of nitrogen (NOx) is also expected from this engine. While we can expect higher temperatures in this engine, favoring production of NOx, this high temperature will last a very short time so that the overall amount of NOx produced is expected to remain low. Lowering the amount of heat going to the cooling system will permit a smaller cooling system and reduce the energy consumed for water circulation.

Further, an adjustable high compression ratio can provide the high pressure needed at the beginning of the power stroke for effective work output, while the free piston extends the length of the stroke for further conversion of energy into work.

In applying the principles of the internal ballistic engine, various configurations can be used. Therefore, referring to FIGS. 3 and 4, and as hereinafter more fully described, a standard piston engine can be modified to include the efficient ballistic principle by substituting the present crankshaft with a ballistic unit providing an angular cylinder or drum mounted about a central shaft which is connected by lever means to the connecting rods of two standard pistons. The central shaft is in turn connected to a hub portion which rotates within the angular cylinder and has projecting therefrom radial piston members which divide the angular cylinder into two equal, semi-cylindrical chambers. Projecting radially inwardly from the interior of the angular cylinder are radial reaction members which extend to and ride along the exposed circumference of the hub portion. The radial reaction members are radial piston members divide the angular space within the angular cylinder into four energy accumulating chambers.

The central shaft in the angular cylinder is further provided with a ratchet and pawl means and is linked through an overriding clutch to the case of the engine. The angular cylinder is further connected to a drive gear which is engagable with an output of an output shaft. Each two conventional cylinders are serviced by a single angular cylinder, so that a six cylinder engine will require three angular cylinders to be converted to a ballistic engine. The two cylinders per angular cylinder correspond to the two chambers serviced by the same piston in the simplified embodiment previously described.

In operation, a power stroke on the first conventional piston will rotate the central shaft ballistically, and with it the inner radial pistons within the angular cylinder. The angular cylinder is provided with one-way valve and port means for allowing air to enter the angular cylinder chambers at atmospheric pressure when the radial members are not moving. As the central shaft rotates, the radial piston members are rotated toward the radial reaction members and the air within the chamber confines between these two members is compressed.

The kinetic energy on the ballistic mass of the engine is being converted into potential energy stored in the two angular cylinders energy accumulator chambers. As the inner angular pistons on the central shaft are rotating faster than the outer pistons on the drum, the inner pistons catch up with the outer pistons, the pressure in the two of the four energy accumulating chambers builds up, and useful energy is imparted to the output shaft through the drive gear as work. Because of the high pressure in the energy accumulating chamber, the time comes when the central shaft is forced backwards.

To prevent the central shaft from reacting backwardly against this pressure, the overriding clutch means interact, and hold the radial piston members against the pressure. As the outer drum with the outer pistons continue to rotate at substantially constant angular velocity, the pressure in the two energy accumulating chambers is diminshed and the flywheel action of the engine builds up pressure in the other two energy accumulating chambers inside the angular cylinder. This pressure now forces the central shaft to rotate in the forward rotational direction but the pawl and ratchet arrangement prevent the central shaft from rotating until the time when the pawl is released.

The potential energy which is stored in the second pair of the energy accumulating chambers is quickly converted into kinetic energy on to the central shaft and connecting rods and conventional pistons. This kinetic energy, in turn is dissipated in the compression of one of the two conventional cylinders linked to the central shaft. As in the simplified embodiment, while one conventional cylinder executes the power stroke of the Otto cycle, the other cylinder executes the intake stroke.

An internal ballistic modification can also be applied to a three rotor engine built in accordance with the U.S. Pat. No. 3,989,012 issued to this inventor. A further improvement of such a rotary engine is disclosed in the patent application Ser. No. 719,664 by this inventor, entitled ANGULAR COMPRESSION EXPANSION CYLINDER WITH RADIAL PISTONS, and now abandoned. As disclosed in that Application, the inherent advantages of an engine using a generally radial configuration include superior thermodynamic properties, lower frictional losses, smaller size and weight and simplification in transmitting the energy of combustion of the fuel mixture into usable torque on an output shaft.

The ballistic engine using the three rotor configuration of the above mentioned application comprises a generally cylindrical housing having an upper constant speed drum rotating in the housing, a lower constant speed drum rotating in the housing, an output shaft axially disposed within the cylindrical housing and connedted with the upper and lower constant speed drums, an upper circular plate adjacent the upper constant speed drum and connected to the output shaft, and a lower circular plate adjacent the lower constant speed drum and spaced from the upper circular plate and also connected to the output shaft. The upper and lower circular plates are topologically positioned towards the center of the engine, between the upper and lower speed drums.

Three circumferentially spaced gears are provided about the upper constant speed drum and the lower circular plate, and a second set of three gears are circumferentially spaced about the output shaft with their axes mounted between a top surface of the lower constant speed drum and the upper circular plate. Corresponding holes are provided in the plates to accept the respective gears. The six gears are engaged with their respective circumferentially neighboring gears in the space between the upper plate and the lower plate. A lower inner rotor is rotatably mounted within the lower constant speed drum and has a lower drive gear engaged with the second set of three circumferentially spaced gears and an upper inner rotor, rotatable in the upper constant speed drum, has an upper drive gear engaged with the first set of three circumferentially spaced gears.

The upper and lower inner rotors have inner radial pistons extending radially outwardly from the respective rotors and the upper and lower constant speed drums have outer radial pistons extending radially inwardly toward the respective inner rotors. The radial pistons of the upper and lower assemblies thus define fractional angular chambers within the upper and lower constant speed drums, which function as conbustion chambers for an internal combustion function.

The structure comprising the ballistic engine modification includes upper and lower energy storage drums which are disposed in respective upper and lower positions on the cylindrical housing of the rotary engine. Angular members extending from the upper and lower rotors are connected to the inner race of overriding clutches disposed within the upper and lower energy storage drums. The outer race of the overriding clutches form hub portions or inner rotors which are rotatable in the respective energy storage drums. Reaction members extend radially inwardly from the energy storage drums. Second radial piston members extend radially outwardly from the outer race or rotor of the energy storage drum and with the reaction members define fractional angular energy accumulation chambers.

Ratchet and pawl means are provided between extensions of the upper and lower inner rotors and the output shaft to provide for the alternate holding and releasing of the upper and lower rotors as described in detail later in the disclosure. The respective upper and lower inner rotors, being connected through the overriding clutch of the hub portion and radial pistons of the upper and lower energy storage drums, can utilize the energy stored in the energy accumulating chambers within the energy storage drums as the respective inner rotors are powered in their normal operation as parts of an overall rotary engine configuration.

DESCRIPTION OF THE PREFERRED EMBODIMENTS

Figure 1:
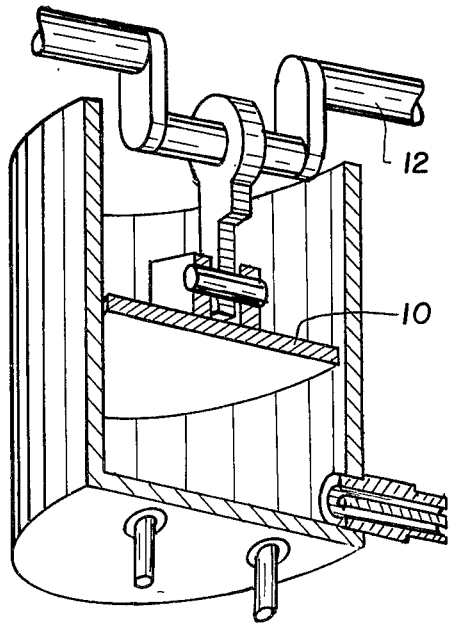
FIG. 1 is a schematic perspective view, with portions cut away, of a piston and cylinder of a standard piston engine.

The elements of a piston engine in its present form are shown schematically in FIG. 1. The motion of the piston 10 is constrained by the crankshaft 12. Further, assuming the position of the crankshaft at the top dead center (TDC) to be 0° as a reference, the piston hardly moves as the crankshaft rotates between −20° to +20°. Especially at low speeds there is ample time for the fuel to burn during this time interval, contributing high temperature and pressure to the gas. The gas may lose as much as 30% of its heat to the cooler cylinder wall during this interval while performing very little work. The amount of work done depends upon the displacement of the piston in the cylinder.

Figure 2:
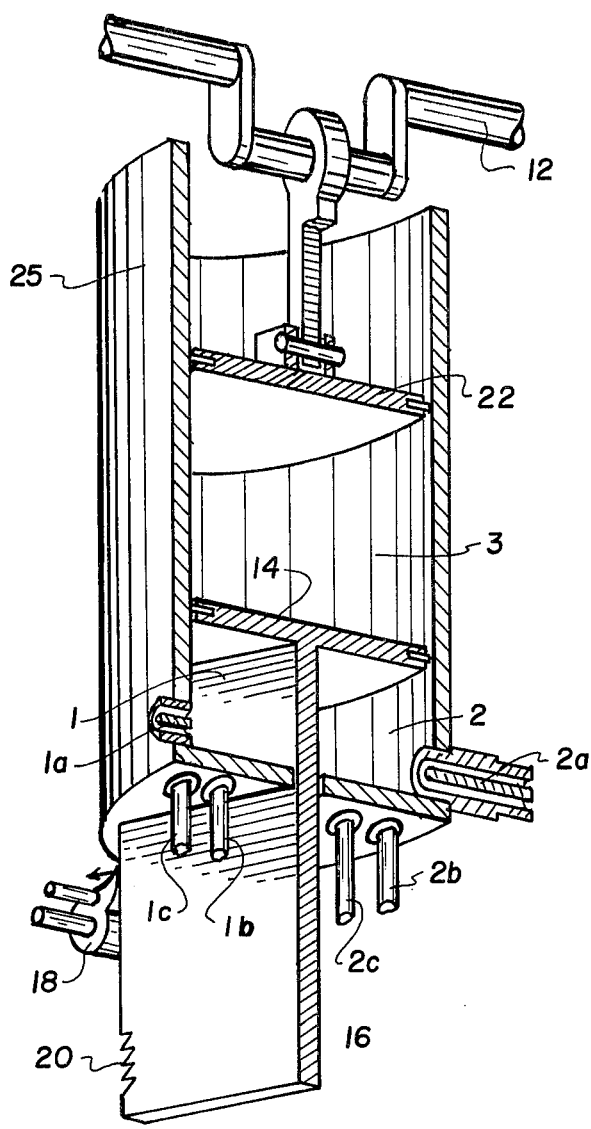
FIG. 2 is a schematic perspective view, with portions cut away, of a rudimentary ballistic engine modification to a standard piston engine cylinder.

FIG. 2 is a schematic representation of an engine having a piston means in the form of a powered piston 14 which is not directly connected to an output means in the form of a crankshaft 12. The engine comprises a casing or cylinder 25 having the powered piston 14 movable therein. A common wall 16 extends downwardly in FIG. 1 from the free moving piston 14 and forms a partition defining a chamber 1 and a chamber 2. Spark plugs 1a and 2a are provided in the respective chambers and each chamber is further provided with intake valves 1b and 2b respectively and exhaust valves 1c and 2c respectively. Valves 1c, 1b, 2c and 2b allow for the passage of a pressurized medium such as an air/fuel mixture and, together, with spark plugs 1a, 2a, comprise power means for the piston 14. A reciprocating piston 22 is movable in the cylinder 25 and mechanically connected to the crankshaft 12.

The means of intaking fresh fuel such as by intake valves 1b, 2b, in chamber 2, where fresh mixture is being compressed and subsequently ignited, the means for igniting the fresh mixture such as by the spark plug 2a and the means for expelling the resulting exhaust gases such as the exhaust valves 1c and 2c comprise the power means.

An energy accumulator chamber 3 is defined between the reciprocating piston 22 and the free moving piston 14 in the casing or cylinder 25. Chamber 3 in this embodiment comprises energy accumulator and converter means and piston 22 with its connection to crankshaft 12 comprises torque producing means. A pawl 18 is mounted adjacent the cylinder 25 and engagable with a ratchet 20 on the common wall 16. Each of the chambers 1 and 2 go through the normal sequence of 4 strokes of the Otto cycle (ie. intake, compression, power, and exhaust). These strokes are staggered so that while one chamber executes a power stroke the other executes a fuel intake stroke. The sequence of strokes in the two chambers can thus be respectively described; in chamber 1, the sequence follows, compression, power, exhaust, intake, compression, etc. and in chamber 2, the respective strokes would be, exhaust, intake, compression, power, exhaust, etc.

After a power stroke in, for example, chamber 1, the free moving piston 14 is forced upwardly and pawl 18 engages in ratchet 20, momentarily holding the free piston 14 in the top position. The air in the energy accumulating cavity 3 is then compressed, forcing the reciprocating piston 22 upwardly and rotating the crankshaft 12. Due to the flywheel action of the crankshaft 12 the reciprocating piston is then moved downward in the cylinder toward the free moving piston, forcing the free moving piston downwardly against the pressure of the air in cavity 3. At this point, pawl 18 is mechanically released from ratchet 20 allowing free moving piston 14 to move downwardly and cause a compression stroke in chamber 2 and an exhaust stroke in chamber 1. Chamber 2 will then go through a power or combustion stroke when spark plug 2a is activated. Free moving piston 14 will then again rapidly move upward in the cylinder 25 converting the heat energy of the combustion chamber 2 to kinetic energy in the form of a free moving piston 14. The free piston 14 will slow down as it approaches reciprocating piston 22 with some of its kinetic energy being stored in the form of potential energy of the compressed air in accumulating chamber or cavity 3. The pressure in cavity 3 then causes reciprocating piston 22 to again be displaced away from free moving piston 14 and thus transferring work to the crankshaft 12. The reciprocating piston 22 because of the continuous rotation of the crankshaft will then move toward the free moving piston 14 in cylinder 25. The ratchet and pawl arrangement 20, 18, however, will prevent the actual reversal of motion in the piston 14, and momentarily holding the free piston up toward the reciprocating piston thus accomplishing four objectives:

1. It helps maintain higher pressure in cavity 3 for further transfer of work to the crankshaft 12.

2. It times the beginning of the next stroke by allowing the free piston to be released at an instant which is related to the crankshaft angle of rotation.

3. It can help control the value of the compression ratio by allowing the reciprocating piston 22 on its way back to further compress the air and thus increase the pressure in the cavity 3 before the ballistic or free piston 14 is released. This pressure can then accelerate the free or ballistic piston 14 more energetically against the new fuel mixture in one of the chambers, 1 or 2.

4. It establishes a minimum duration for the time period of the cycle. This period is determined in accordance with the equation: $T = a/2S$, where; a is the average acceleration which equals the average force divided by the mass of the piston and S is the distances the piston will travel before it stops. Note that the period T gets longer as the force on the piston is cut down. The force on the piston, for the same compression ratio, is mainly controlled by the amount of fuel charged into the combustion chamber by a throttling means connected to the engine. Such a throttling means can be the accelerator pedal of a car and its connecting mechanisms. Thus, if the fuel is diminished, for example, by one quarter of full throttle, T will only be increased by a factor of two. It is desirable that the value of T remains smaller than $\frac{1}{2}$ the period of revolution of the crankshaft. This implies a fast free moving piston, which, after full expansion of the combustion chamber, is held up by the pawl and ratchet arrangement. Synchronization between the crankshaft 12 and the free moving piston 14 is accomplished by the timely release of the piston as a function of the crankshaft rotation and not by the original period T of the free moving or ballistic piston 14. The time of the release may be set in terms of a predetermined distance between the free moving piston 14 and the reciprocating piston 22, as the latter, which is driven by the crankshaft 12, returns toward the free moving piston 14. There exists self regulation in this process. That is, if the free moving piston 14 were to reach further up on the cylinder 25 than it would be normal, it will be reached and be released earlier by the crankshaft so that it will also be stopped earlier with respect to the crankshaft rotation and therefore will not reach as high up in the next cycle.

The predetermined distance between the two pistons 22 and 14 for the release of free piston 14 by the pawl 18, will remain adjustable and this will provide an automatic adjustment to the compression ratio. The smaller this distance, the greater the compression ratio. This feature will be particularly helpful at low speeds where the pressure is usually low because of the reduced amount of fuel charge, and also, because of the relatively low speed in the conventional engines, more time becomes available for heat losses, further reducing the thermal efficiency.

Therefore, in a case where an accelerator pedal is retracted, the distance between the two pistons 14 and 22 at which the free piston 14 is to be released, is automatically adjusted to become smaller. The energy for the increased pressure in the cavity 3 comes from the crankshaft 12 as is presently the case in the piston engines.

Figure 3:
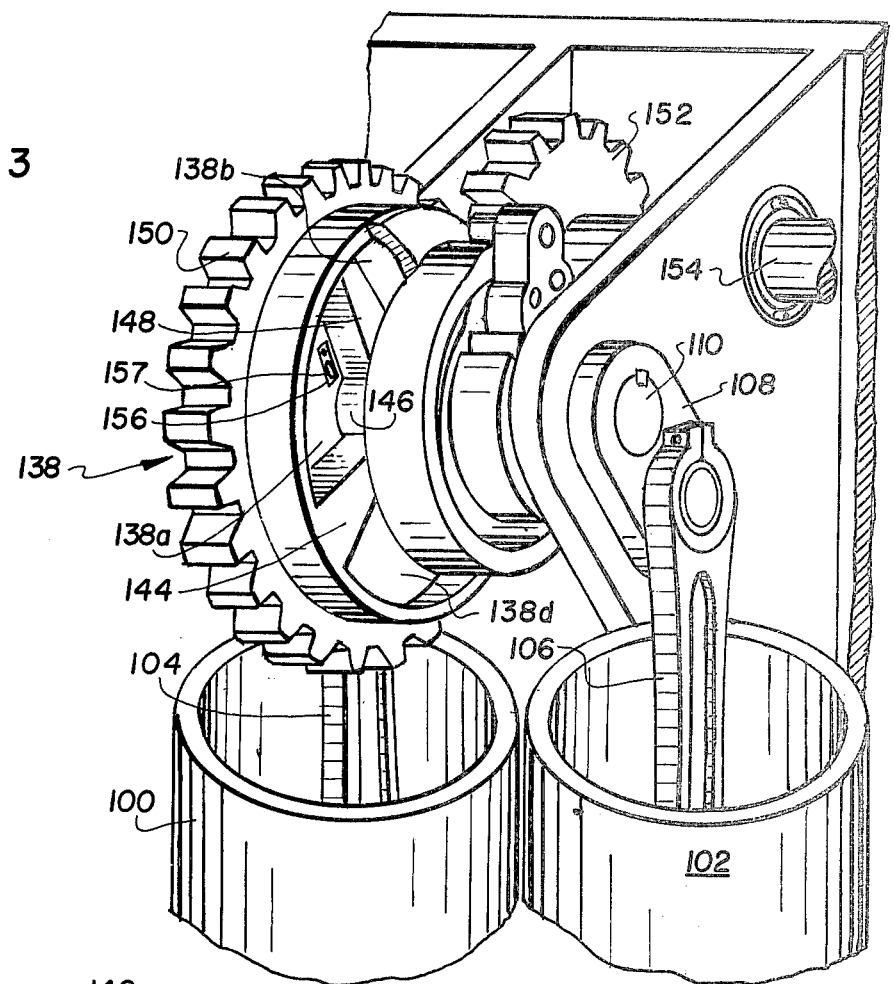
FIG. 3 is a schematic perspective view of a ballistic engine modification to two cylinders of a standard piston engine.
Figure 4:
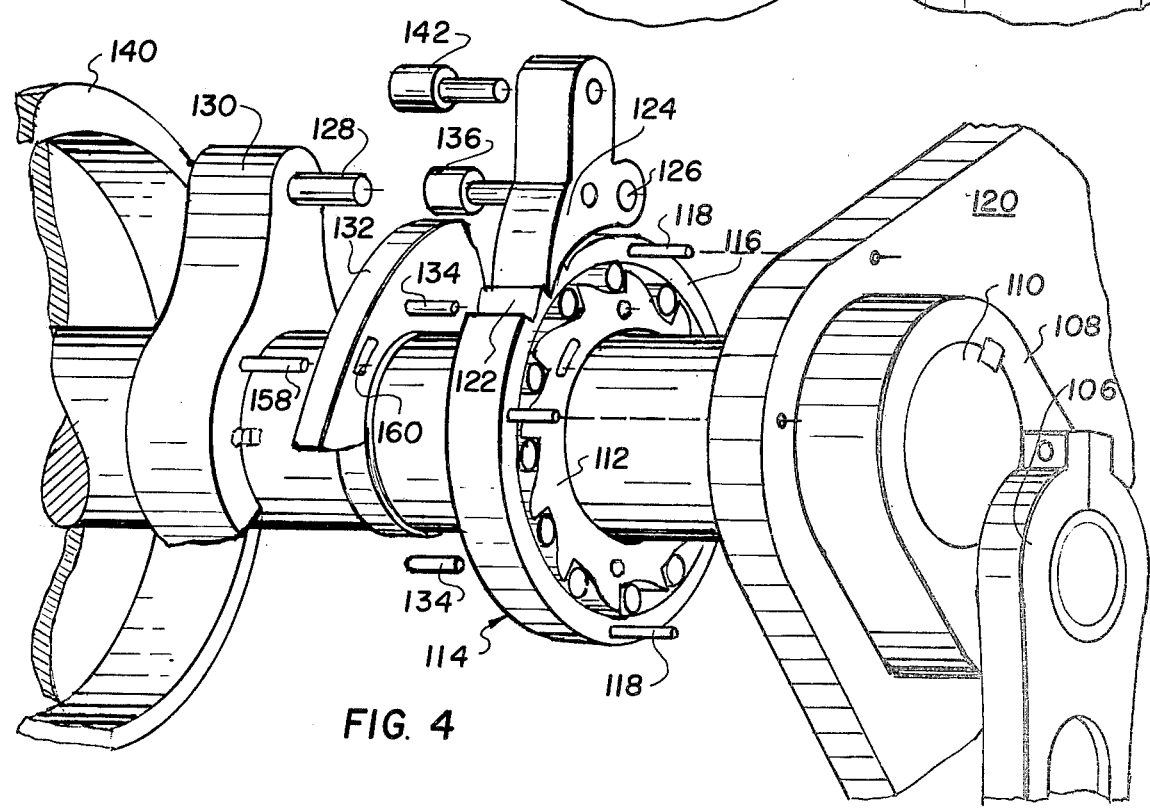
FIG. 4 is an exploded detailed view of portions of the embodiment shown in FIG. 3.
Figure 5:
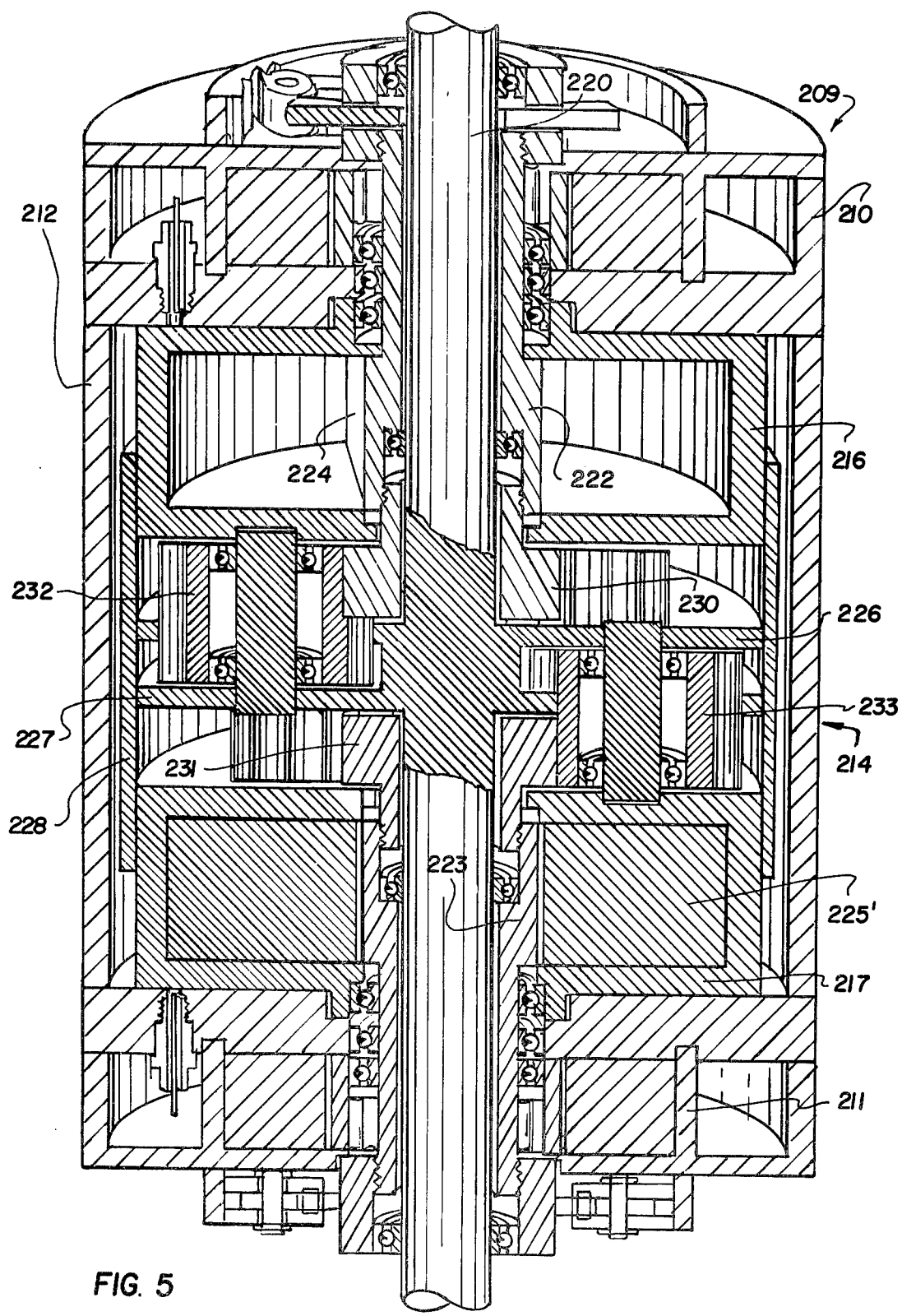
FIG. 5 is a perspective view, partially in section, of a rotary engine having an internal ballistic modification.

The use of the internal ballistic engine principle in conjunction with an existing piston engine is illustrated in FIGS. 3 and 4. Cylinders 100 and 102 of the standard piston are indicated in FIG. 3 which comprise the power means and piston means of the embodiment. Pistons in each of the cylinders (not shown) have connecting rods 104 and 106 extending therefrom. Connecting rod 106 is connected to a lever arm or crank 108 which in turn is connected to a central shaft 110. As best seen in the exploded view of FIG. 4, an inner race 112 of an overriding clutch generally designated 114 rotates about the center shaft 110. An outer race 116 of the overriding clutch 114 is rigidly connected to a holding bracket 120 by pins 118.

The outer race 116 is provided with a ratchet 122 which is engagable with a pawl member 124. The pawl 124 is pivoted about its pivot point 126 which is connected through pin 128 to a pawl holder extension 130. Pawl holder extention 130 is keyed into the center shaft 110, and rotates therewith. An inner cam 132 is connected through pins 134 to inner race 112 of the overriding clutch 114. An inner roller 136 is connected to the pawl 124 and rides on the inner cam 132 which causes the pawl 124 to disengage from the ratchet 122 at its appropriate angular position. An energy accumulating drum or constant rotating drum generally designated 138 is provided, on its outer periphery, with an outer cam 140. Outer roller 142 is provided on pawl 124 and rides on the outer cam 140 to disengage pawl 124 from the ratchet 122 at the outer cams appropriate angular position. As best seen in FIG. 3, the energy accumulating drum 138 is provided with a pair of rigidly connected outer radial pistons 144. An inner hub 146 is connected to the center shaft 110, and provided with a pair of inner radial pistons 148 which extend outwardly therefrom and ride along the inner surface of constant rotating drum 138. Similarly the outer radial pistons 144 ride along the exposed surfaces of the hub portion 146. The radial pistons 148 and 144 divide the energy accumulating drum or constant rotating drum 138 into four energy accumulating chambers.

Three of the chambers are shown and indicated as 138a, 138b, and 138d. Energy accumulating drum 138 is provided with a gear 150 which is engaged to a drive gear 152 which, in turn, provides torque to an output shaft 154. Output shaft 154 comprises an output means with the connecting parts between the energy accumulating drum and the pistons 100, 102 and shaft 154 comprising torque producing means. Energy accumulating drum 138 is further provided with ports 157 which are covered by reed valves 156. The port, and valve, arrangement is provided to allow the chambers in the energy accumulating drum to reach ambient atmospheric pressure when the chamber is at maximum expansion. As best seen in FIG. 4, pawl holder extention 130 has a pawl holder post 158 which rides in a cam plate slot 160 on the inner cam 132.

In operation when the piston in cylinder 102 executes a power stroke of its standard Otto cycle, the connecting rod 106 is forced upwardly and causes the center shaft 110 to rotate in a counterclockwise direction. The hub 146 with its inner radial pistons 148, then rotates and a counterclockwise direction compressing the air in chamber 138a and the opposite chamber not shown in FIG. 3. The piston in cylinder 102 is then moving freely in a manner similar to that of the piston 14 of FIG. 2 against the compressed air in cavity 3. The increased pressure in the chamber 138a and its opposite chamber will apply a torque to the drum 138 and therefore to the output shaft 154 through gears 150 and 152. With the center shaft 110 rotating much faster than the drum 138, the point will be reached where the center shaft 110 will stop and be urged to reverse its motion under the high pressure inside the chambers. As the center shaft 110 reverses its rotation, the pawl holder extention 130 which is connected to the shaft 110 will also reverse its motion. The pawl holder post 158 will then move in a clockwise direction in the slot 160 of the inner cam 132. Chambers 138a through 138d comprise energy accumulator and converter means.

The relative motion of the pawl holder extention 130 and the cam plate 132 will occur because the latter is rigidly engaged with the inner race 112 of the overriding clutch 114. The outer race 116 of the overriding clutch 114 is rigidly connected to the holding bracket 120. The rotation motion of the inner cam plate 132 therefore is restricted to counterclockwise rotation with clockwise rotation being prevented by the overriding clutch 114. The relative motion of the inner cam 132 with respect to the pawl holder extention 130 will release the inner roller 136 and the pawl assembly 124 will be lowered into the ratchet 122 of the outer race 116. The clockwise travel of the central shaft 110 will be restricted to the extent of the pawl holder post traveling inside the cam plate slot 160 because as has been explained, the inner cam plate 132 cannot rotate in the clockwise direction. The center shaft 110 and, therefore, the inner pair of pistons 148 connected to it, will wait at this position until, as the drum 138 carrying the outer pair of pistons 144 keeps rotating, the time is reached when the pressure in the chambers 138d and 138b become greater than that in the chambers 138a and the opposite chamber not shown.

The center shaft 110 then starts moving in the counterclockwise direction again. Pawl 124 will then be lowered and engage with ratchet 122 on the outer surface of the outer race 116. The motion of the center shaft 110 will therefore again be stopped, until the outer cam 140 on the drum 138 urges the outer roller 142 upwardly disengaging the pawl 124 from the ratchet 122. This frees the shaft 110 to rotate in a counterclockwise direction. The pawl holder post 158 will then move clockwise inside the cam plate slot 160 while the pawl 124 continues to be held by the outer cam 140 and the outer roller 142. At this point, both the inner cam 132 and the inner race 112 by the overriding clutch 114 will be accelerated by the inner pair of pistons 148.

Note that the acceleration and therefore the kinetic energy which the center shaft 110 and associated connecting rods will acquire, will depend on the timing at which the outer cam 140 operates on the outer roller 142 to release the pawl 124.

This timing, therefore, can be used to control the compression ratio of the cylinders 102 and 100. While not shown here, the outer cam 140 be caused to rotate as the center member of a differential unit with one of the outer members of the differential driven by the drum while the second outer member of the differential continuously adjusts as a function of the position of the accelerator pedal.

Hence, the time of the pawl release is controlled by the position of the accelerator pedal. Even without this control, however, the compression ratio will be self regulating to greater values for smaller amounts of fuel mixture. The kinetic energy of the inner pair of pistons 148 and thus, the center shaft 110 and the connecting rods 106 and 104, by the pressure in the chambers 138b and 138d, will be provided by the flywheel action of the engine and will be subsequently totally spent in exhausting cylinder 102 and compressing the new charge of fuel and air in cylinder 100. Combustion of the fuel charge now in cylinder 100 repeat the steps described above and therefore a single drum assembly can serve two out of phase cylinders.

Although it appears that replacing the standard crankshaft of an engine with the arrangement of FIGS. 3 and 4 is a complexity, other factors must be considered. If the new arrangement boosts thermal efficiency, less fuel may be needed for the same power output and therefore the size of the cylinders can be reduced. Further, the capacity of the cooling system can be reduced, and the size of the gas tank can be cut down. The compromise in adding the complexity between the connecting rods and the drive shaft therefore, are more than counteracted by the reduction in complexity and weight of other systems in the engine.

Another advantage of using an internal ballistic design is smoothness in operation because the output shaft is no longer directly engaged with the cylinder and pistons. An intermediate air cushion is provided to smooth the action. For this reason it may be possible to reduce the overall number of cylinders in an engine without sacrificing smoothness of operation. With the piston and cylinders being relatively free to move, a reduction in cylinder wear can be expected mainly in the forward part of the cylinder where high temperature is the main cause of wear. As a cooler cylinder piston is expected in connection with the new arrangement, further reduction in piston wear can also be expected.

FIGS. 5 through 8 show an embodiment of the ballistic engine utilizing a tri-rotor power unit or rotary engine configuration generally designated 209 which has been moe fully disclosed in the patent application entitled ANGULAR COMPRESSION EXPANSION CYLINDER WITH RADIAL PISTONS filed Sept. 1, 1976, having Ser. No. 719,664, and now abandoned. The tri-rotor power unit 209 is provided with an upper energy storage drum 210 and a lower energy storage drum 211 which are fixed at opposite ends of a case 212.

In general, the engine can be divided about a central interlinkage unit generally designated 214 into symmetrical upper and lower portions. Each portion has a constant speed drum 216 and 217 which are rigidly connected to and rotate with an output shaft 220. Rotatably mounted within each constant speed drum 216 and 217 are respective upper and lower inner rotors 222 and 223. Extending radially outwardly from the upper and lower inner rotors 222 and 223 are respective pairs of inner radial pistons 224 and 225. These radial pistons extend radially outwardly from the inner rotors and are interleaved with pairs of radial pistons provided on the respective upper and lower constant speed drums 216 and 217 not shown but more fully described in the above mentioned application.

The operation of the various radial pistons is more fully described later in the disclosure and with reference to FIG. 10 which is a schematic flow chart of the operation of these elements and their correlation with the upper and lower energy storage drums. The upper and lower moving portions of the tri-rotor power unit 209 is further described with reference to FIG. 7 which is detailed view of the interlinking unit 214 with portions cut away for clarity. Interlinking unit 214 comprises a differential arrangement connected between the upper and lower inner rotors of the tri-rotor power unit 209.

Upper and lower plates 226 and 227 are rigidly connected to output shaft 220 and rotate in unison with upper and lower constant speed drums 216 and 217 which are rigidly connected with central cylinder 228. Keyed into upper and lower inner rotors 222 and 223 are upper and lower torque gears 230 and 231 which freely rotate about shaft 220. Mounted for rotation between lower plate 227 and upper constant speed drum 216 are three upper planetary gears 232. Similarly mounted between upper plate 226 and lower constant speed drum 217 are three lower planetary gears 233.

Gears 232 and 233 mesh with respective torque gears 230 and 231 and all six planetary gears 232 and 233 are engaged for rotation in the area between upper and lower plates 226 and 227. In operation a clockwise rotation introduced by the upper inner rotor 222 rotating in the upper constant speed drum 266, urges the lower inner rotor 222 in the lower constant speed drum 217 to rotate counterclockwise, and visa versa.

The interlinking unit 214 thus uses the drums and plates which are rigidly connected to the output shaft as a pivot point, therefore, when a driving torque is applied on one inner rotor, while the other rotor is prevented from rotating, it is as if a torque of twice the value of the driving torque is applied to the output shaft. The drums and rotors thus comprise torque producing means. When a driving torque is applied to one inner rotor and the other inner rotor is free to rotate no torque is imparted to the output shaft 220 and the total driving torque is converted to rotational kinetic energy in both rotors. It is during these intervals when the motion of the inner rotors is solely determined by the internal pressure forces and not by their engagement with either the output shaft or the other inner rotor that the engine displays internal ballistic properties.

Figure 7:
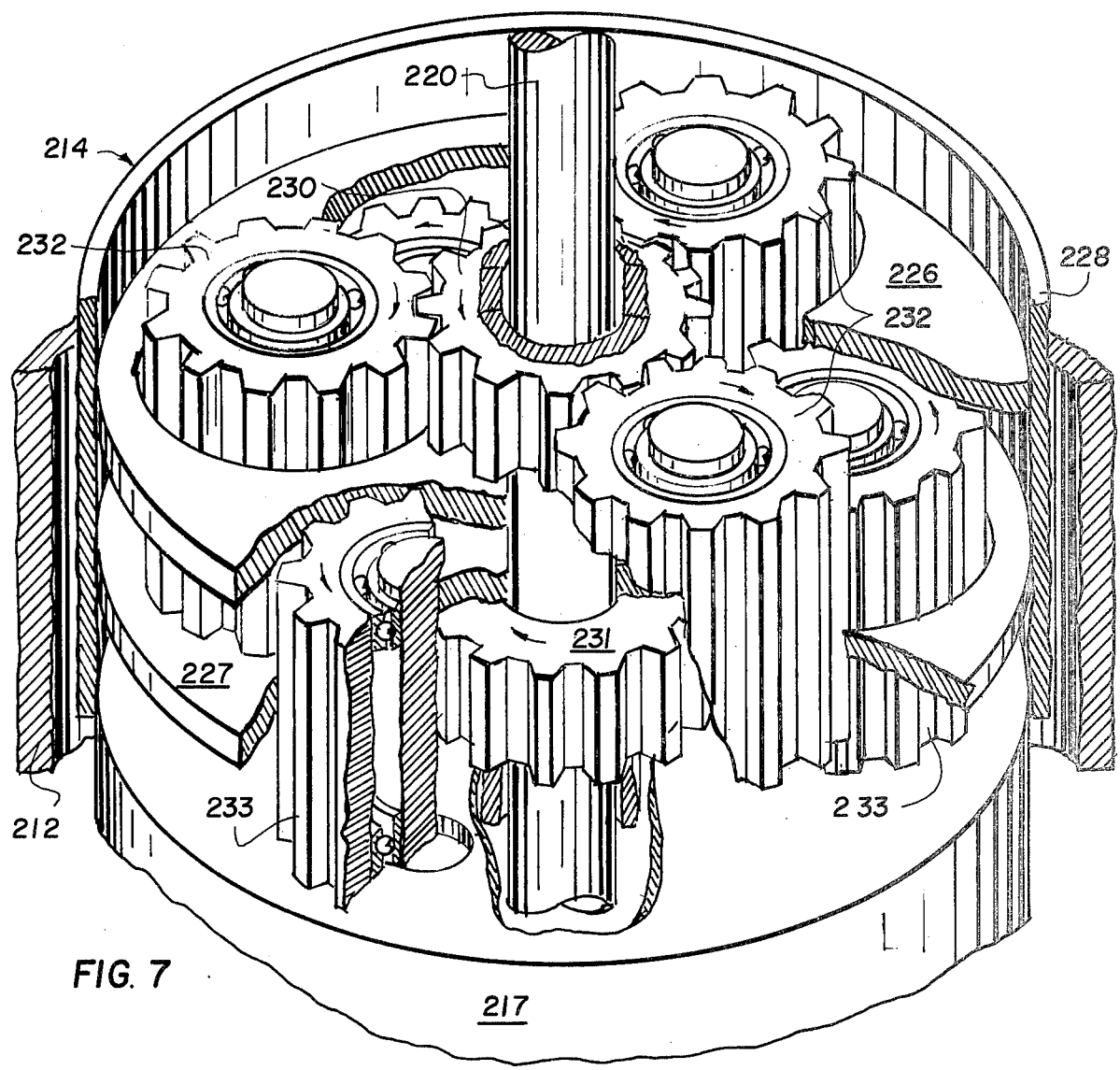
FIG. 7 is a perspective view, with portions cut away, of the differential gearing means interlinking the upper and lower rotors and drums of the rotary engine shown in FIG. 5.

In addition, the embodiment for an interlinkage unit 214 shown in FIG. 7 is a sturdy construction which provides an infinate rotational relation between the upper and lower inner rotors. This unit is therefore capable of providing the angle of 270 degrees of relative rotation between two inner rotors required for reversal of the inner rotors, when using an energy storage drum as hereinafter described.

Figure 6:
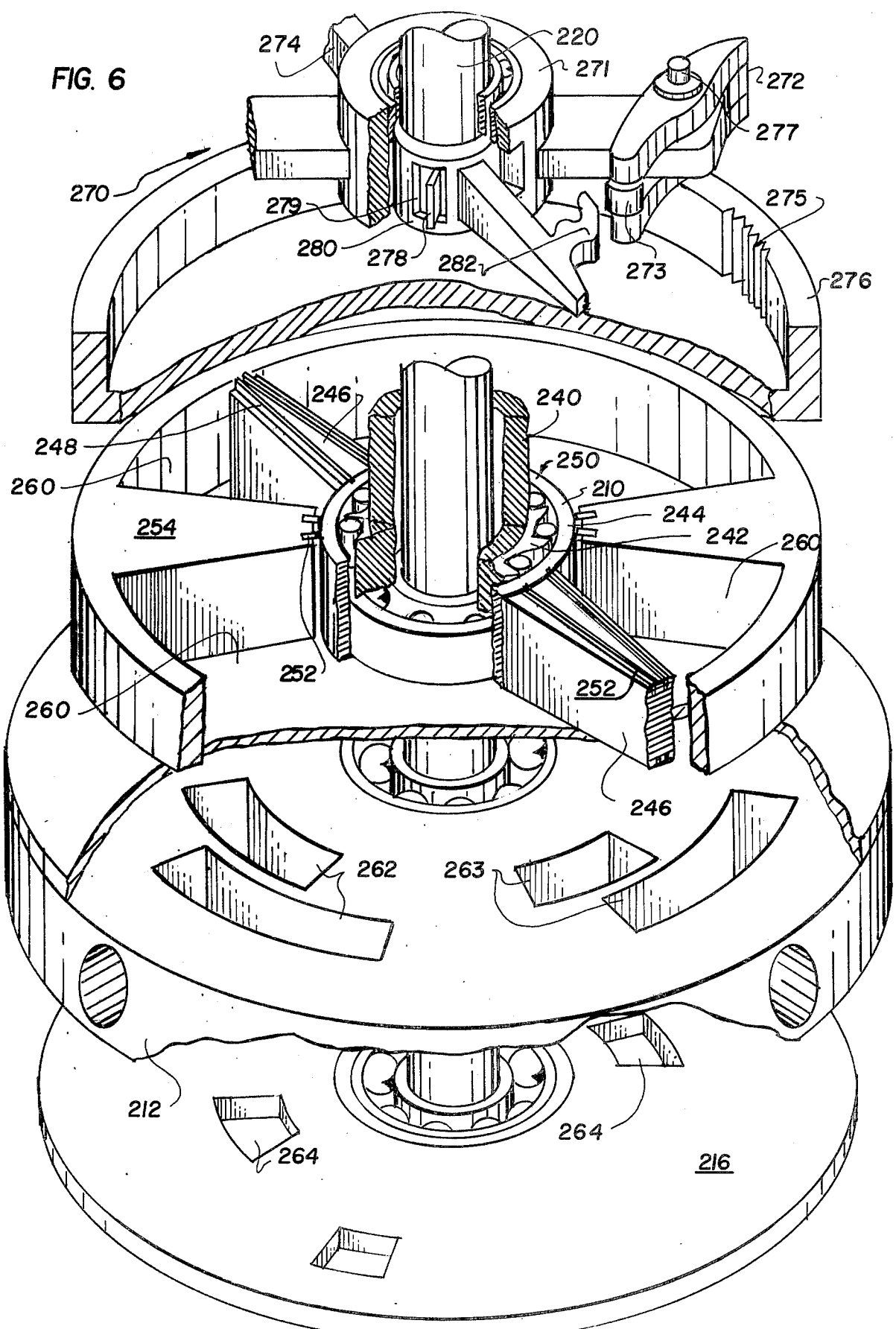
FIG. 6 is an exploded perspective view of the ballistic arrangement on the upper portions of the radial ballistic engine shown in FIG. 5.

Referring now to FIG. 6 which is an exploded detailed view of the upper energy storage drum 210. A portion of the upper inner rotor 240 extends upwardly from the inner rotor 222 and is fixed to the inner race 242 of an overriding clutch 250. The outer race 244 of the overriding clutch 250 connected to two radial energy storage pistons 246 which rotate with sealing elements 248 and 252 within the energy storage drum 210.

Energy storage drum which comprises part of the energy accumulator and converter means. In FIG. 6, in cyclic succession, one of the chambers 260 exist in the power stroke phase, imparting kinetic energy to the piston 246. The chamber 260, being in the compression stroke accumulates potential energy and therefore provides a major part of the energy accumulator and converter means. 210 is further provided with two energy storage pistons 254 which extend radially inwardly toward the outer race of the overriding clutch 250. Energy storage drum 210 is further rigidly connected to the upper portion of casing 212 and with the energy storage pistons 246 and 254 define four energy accumulating chambers 260. As best described in the above mentioned application Ser. No. 719,664, exhaust slots 262 and intake slots 263 on the case 212 interact with chamber ports 264 on the upper surface of upper constant speed drum 216 to achieve the powering cycles of the tri-rotor power unit 209.

Pawl and ratchet unit generally designated 270 is provided over the energy storage drum 210. Pawl holder sleeve 271 is rigidly connected to the upper rotor extention 240 and in turn to the upper rotor 222. Connected to the pawl holder sleeve 271 is a pawl 272 pivoted on pawl pivot 277.

Protruding post 278 is provided on output shaft 220 and rides in cylinder slot 279 of a release arm cylinder 280. Extending from the release arm cylinder 280 is a pawl latch 274 with a hook 282 which is engagable with a roller 273 of the pawl 272. Pawl 272 rotates within an angular drum extention 276 having a ratchet portion 275. In general, the pawl and ratchet unit 270 functions to engage the upper rotor extention 240 with the casing of the engine for preventing the upper inner rotor from being released to move forward before a predetermined time instant.

The function of the pawl and ratchet arrangement in the tri-rotor embodiment is similar to that of the pawl and ratchet as explained in connection with the simplified embodiment of FIG. 2, and the embodiment described in FIGS. 3 and 4.

In operation, when inner rotor 222 rotates in the clockwise direction, extention 240 which is connected to the inner race 242, also rotates in this direction and causes the engagement between the inner and the outer races of the overriding clutch 250, which in turn causes the energy absorbing piston inner piston 246 to move in the energy storage drum 210 and compress to such an extent that the energy absorbing piston 246 reverses its rotation urging the rotor 240 to rotate in the forward direction, pawl 272 engages into ratchet 275 and stops this rotation. Output shaft 220 (which has constant forward, counterclockwise, rotation due to the subsequent power strokes in the tri-rotor unit 209) is provided with post 278 which extends through a slot 279 and pushes the pawl hook 282 under roller 273 of pawl 272. This motion disengages pawl 272 from ratchet 275 thus releasing the inner rotor 222 and all connected parts thereto.

Figure 8:
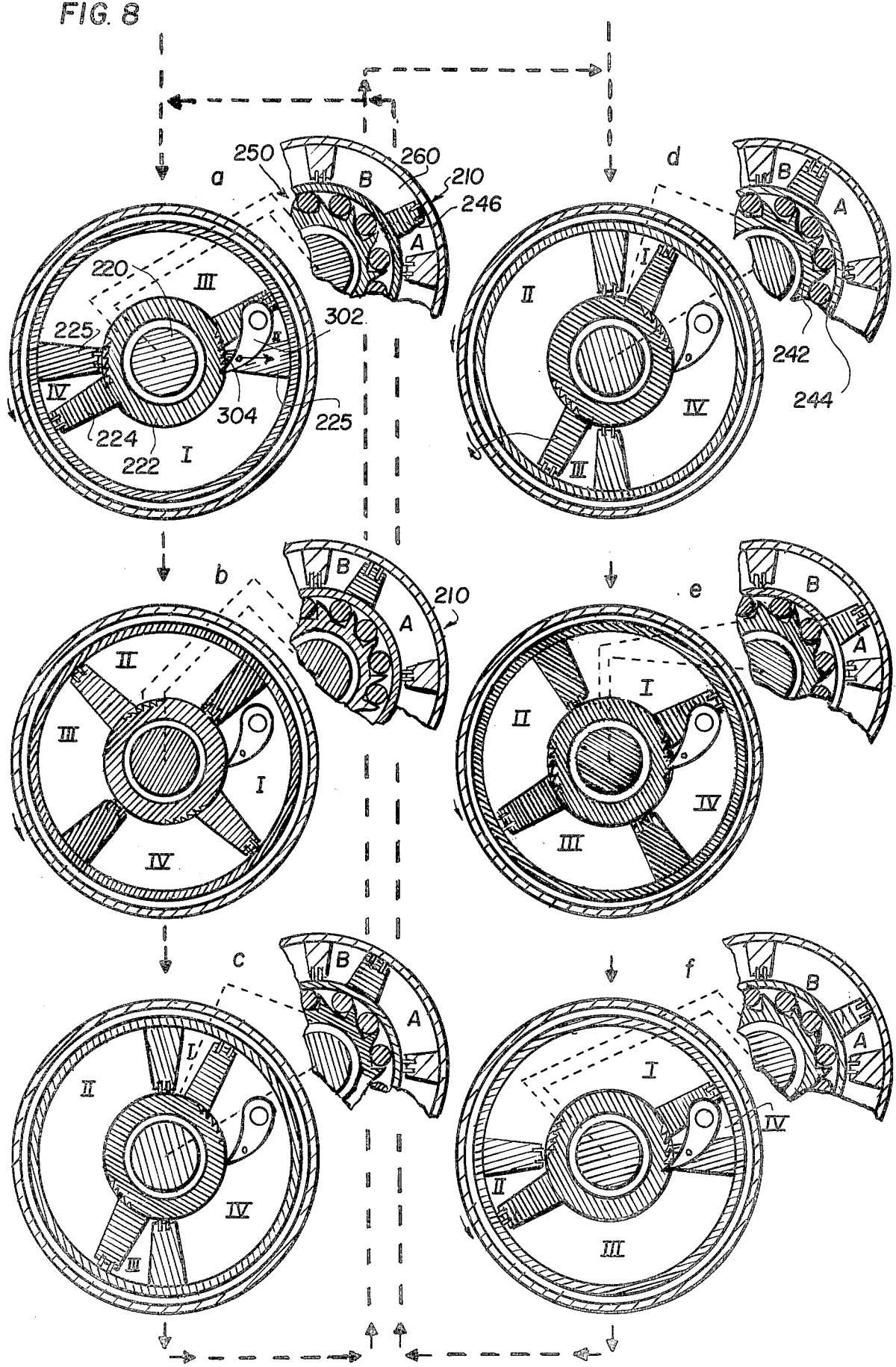
FIG. 8 is a schematic representation of the relative positions and motion of the inner rotors and drums and the corresponding ballistic rotors and drums of the embodiment of FIG. 5.

To understand the ballistic effect of the energy storage drum and its connection with the tri-rotor motor assembly, reference should be made to FIG. 8. FIG. 8 is a composite figure of six successive positions in the tri-rotor motor and energy accumulating drum sections of the invention. The relative motion of the radial pistons, as they execute four strokes of the Otto cycle, are indicated by the arrows and dotted lines. The radial pistons in the upper drum, for example, will be successively positioned as shown by the figure segments a, b, c, d, e, f, a, etc. At the same time the corresponding positions of the radial pistons in the lower drum will be d, e, f, a, b, c, d, etc.

The fragmented sections on the upper right of each main segment refers to the position in the energy storage drum 210 associated with the particular inner rotor 222. The dashed lines are used to indicate the mechanical connection between corresponding shafts in the main figure segment and the fragmented figure segment. The fragmented section shows the inner rotor of the combustion chamber to be engaged with the inner rotor of the energy storage cavity or drum through an overriding clutch 250 as shown in greater detail in FIG. 6.

When the inner rotor of the combustion chamber rotates clockwise, it engages the inner rotor of the energy storage drum which carries with it a pair of inner radial pistons 246, 246. Air is compressed in the angular cylinder section A against the pair of outer pistons 254 fixed to the drum 210, which in this case is stationary. The building of pressure between the two types of pistons converts the kinetic energy on the rotor 222 into potential energy in chamber A. As it tries to reverse its motion, inner rotor 222 is caught by pawl 302 and ratchet 304 arrangement shown only schematically in FIG. 8. The actual construction of such a pawl and ratchet arrangement is shown in FIG. 6.

Assuming the radial pistons in the upper drum are positioned as shown in segment a in FIG. 8, the pawl 302 and ratchet 304 arrangement prevents the inner pistons from moving in the positive direction of rotation which in this engine will be counterclockwise. Outer radial pistons 225, 225¹ and the shaft 220 rotate at a constant velocity in the counterclockwise direction. Segment a shows the instant at which the inner rotor 222 is released by the pawl 302.

The four chambers represented by I, II, III, and IV, switch at this instant from respective intake, compression, power, and exhaust chambers to respective compression, power, exhaust, and intake chambers. Release of the inner rotor 222 of the combustion chamber as seen in segment b, causes it to move in the positive direction or counterclockwise direction. It receives a further impetus from the compressed air in chamber A pressing against inner piston 246 of the energy storage drum 210 engaged with the inner rotor 222 through the overriding clutch 250.

In this process, the energy storage drum returns the energy stored in it in the time interval represented by segment a and b of FIG. 8. This same physical structure (namely the inner rotor 222) becomes a reaction member, obeying internal ballistic principles in this time interval.

Upon release of the inner rotor 222 by the pawl 302 a pair of inner pistons 224 of the combustion chamber, being free to rotate, will behave according to the laws of ballistice and will be accelerated by the pressure in chamber II caused by burning fuel and by the torque which will be provided from the energy accumulating drum through the overriding clutch 250 and the accumulative pressure in chamber A.

Just prior to the instant of release of the inner rotor 222 in the upper drum segment a, the inner rotor 223 in the lower drum, also carrying a pair of inner pistons, shown in segment d, is rotating at a speed exactly equal to twice the speed of the output shaft 220. The new fuel charge in chamber I is at this point being compressed. The inner piston will continue at the same speed until the instant the inner rotor 222 in the upper drum segment a is released. Because of the interlinkage between the inner rotors 222, 223 in the upper and lower drums, generally designated 214 in FIG. 5, the angle between the radial pistons of chamber II shown in segment a will be exactly equal to the angle between radial pistons of chamber I of segment d.

After release of the inner rotor shown in segment a these angles will continue to decrease for the time it takes the inner rotor 222 in the upper drum to accelerate from rest to the speed of the output shaft 220, and for the inner rotor 223 in the lower drum to decelerate from speed of twice the speed of the output shaft 220 to exactly the speed of the output shaft 220. At this point both chambers will begin to increase in volume, always at the same rate, so that the angle between radial pistons in each will always continue to be equal.

During the internal ballistic mode, the size of chamber I of segment d will be increased rapidly by the outer piston moving counterclockwise. The same angular increase will apply to chamber II shown in segment a with the inner rotor accelerating to high rotational speed. It should be noted, however, that as soon as the inner rotor shown in segment e starts moving clockwise, it will engage the inner rotor of the energy storage drum through the overriding clutch 250.

The pressure in cavity A will increase as the radial pistons, defining this chamber, approach each other. The inner rotors in both the combustion chamber and the energy storage drum will eventually come to a stop and will tend to reverse their direction of motion. At this point, their continued movement will be stopped by the pawl and ratchet arrangement as shown schematically in segment a, and in detal in FIG. 6.

Correspondingly, the free inner pistons in the upper drum will attain high speeds immediately following ignition. As the angle in chamber II must be kept the same as in chamber I of segment e, the free pistons of the upper drum will start decelerating as the pressure in the cavity A of the lower energy storage drum increases. At the instant the inner rotor in the lower drum comes to a stop, the inner rotor in the upper drum will be traveling at a speed equal to twice that of the output shaft of segment c, representing the pistons in the upper drum, while the segment f represents the pistons in the lower drum. Note that during the time between segment e and f the inner rotor is held by the pawl and ratchet arrangement. On the other hand, chamber II of the upper drum continues to rotate in the positive direction (counterclockwise) until it reaches the position where the new charge in chamber I is being compressed.

Further note that during the time when the lower inner rotor is held fixed, the output shaft receives an equal forward force from each chamber; chamber II of the upper drum and chamber I of the lower drum. In segment a assume a force F on each radial piston. The outer piston then experiences a force − F since the pressure is ahead of it; but as previously explained with the upper inner piston receiving force F and the lower piston being held fixed, (segments d and e) a force of +2F is effectively reflected onto the output shaft, so the net force on the output shaft from chamber II of the upper drum of segment b is also F.

Shown in segment e, chamber I in the lower drum also provides force +F per radial piston. The output shaft receives force +F directly from the cavity as the pressure there comes from behind the inner piston, but since the inner rotor of the upper piston moves at full velocity, there is no additional force being reflected from the upper inner rotor to the output shaft. The net force, therefore, received by the output from the pressure in chamber I of the lower drum of segment e is also +F, and the total force received by the output shaft from the chambers of both upper and lower drums is +2F. Note that segment c is effectively the same as segment d which indicates that during the next stroke the upper inner rotor will undergo the reverse motion which the lower inner rotor has executed during the previous stroke, as has been demonstrated in segment d, e, and f; while the inner rotor of the lower drum will execute the forward motion which the upper inner rotor performed during the previous stroke as demonstrated by the figures of FIG. 8.

In the tri-rotor motor (FIG. 5) as in the case of the rudimentary ballistic engine, (FIG. 2) the compression ratio depends on the timing of the release of the inner rotors by the pawls. This timing can be controlled as a function of the accelerator pedal of a vehicle using the engine. Even without this special control the engine provides some self-regulation of compression ratio since for smaller amounts of fuel mixtures in the chambers the maximum pressure will be smaller and therefore smaller cylinder angles will be reached before the motion of the ballistic piston is reversed.

It may be noted that the tri-rotor configuration is naturally suited for the ballistic engine design. As one chamber follows another, at infinitum, the inner piston separating two adjacent chambers becomes the ballistic piston moving from the chamber executing a power stroke to the chamber executing a compression stroke. The latter then behaves as the energy accumulator chamber for the adjacent previous chamber, so that there is no need for a separate energy storage chamber. That is, each chamber undergoes through each of the strokes of the Otto cycle and each chamber while in the compression stroke also behaves as an energy accumulator chamber next to the chamber undergoing the power stroke.

The external energy storage chamber 260 is an additional feature, not covered in the model in FIG. 2, to allow expansion of the chamber undergoing a power stroke by both the inner piston and the outer piston simultaneously, for further increase in the thermal efficiency of the engine.

While the piston engine cannot match the volume, weight, and mechanical efficiency of the tri-rotor motor the application of the ballistic principle can improve its thermal efficiency of the linear piston engines.

While preferred embodiments of the present invention have been described in detail it will be understood by those skilled in the art that various modifications can be made therein without departing from the principals of the invention.

What is claimed is:

1. An internal ballistic engine comprising a casing, at least one pair of power means for intermittently providing internal pressure, output means for providing mechanical work, piston means connected to said power means, said piston means providing surfaces onto which the internal pressure of said power means operates, said piston means being independent of said output means and therefore capable of being ballistically accelerated during a power stroke by the internal pressure of either of said power means with respect to said output means, whereby a portion of the internal energy of the power means, in the power stroke, it quickly converted into kinetic energy which is imparted onto said piston means, thereby lowering the internal temperature and pressure for lowering the rate of heat loss of said power means, energy accumulator and convertor means in tandem with the power means, which is undergoing the power stroke, to which the kinetic energy of the ballistic pistons is imparted as potential energy, and torque producing means, connected between said energy accumulator and convertor means and said output means for converting the potential energy into output torque at said output means, said energy accumulator and convertor means comprising a portion of said casing between said piston means and said torque producing means, said piston means being movable in said casing, said torque producing means also being operably movable in said casing, said piston means, said torque producing means, and said casing defining an energy accumulation chamber having a compressible gas therein, the compressible gas being operable for storing potential energy when said energy accumulation chamber is reduced in volume.

2. An internal ballistic engine comprising a casing, at least one pair of power means for intermittently providing internal pressure, output means for providing mechanical work, piston means connected to said power means, said piston means providing surfaces onto which the internal pressure of said power means operates, said piston means being independent of said output means and therefore capable of being ballistically accelerated during a power stroke by the internal pressure of either of said power means with respect to said output means, whereby a portion of the internal energy of the power means, in the power stroke, is quickly converted into kinetic energy which is imparted onto said piston means, thereby lowering the internal temperature and pressure for lowering the rate of heat loss of said power means, energy accumulator and convertor means in tandem with the power means, which is undergoing the power stroke, to which the kinetic energy of the ballistic pistons is imparted as potential energy, and torque producing means, connected between said energy accumulator and convertor means and said output means for converting the potential energy into output torque at said output means, said casing having an elongated cylinder and wherein said output means comprises a crankshaft and said torque producing means comprising a first piston connected to said crankshaft and reciprocally movable within said cylinder for producing a torque to said crankshaft, a second piston spaced from said first piston thereby defining an energy accumulation chamber with said first piston and said cylinder and having a compressible gas therein, and a powering unit disposed in said cylinder connected to said second piston for producing power through internal combustion.

3. A ballistic engine according to claim 2 wherein said elongated cylinder is closed at an end adjacent said second piston, a wall extention connected to said second piston and extending through said closed end, dividing a portion of said cylinder behind said second piston into two combustion chambers, a spark plug associated with each of said combustion chambers, said combustion chambers usable with said second piston to produce an internal combustion effect and comprise said power means.

4. A ballistic engine according to claim 3, wherein said wall extension includes a ratchet, and a pawl is pivotally connected to said housing adjacent said wall extension, said pawl being engagable with said ratchet for holding said second piston in a position toward said first piston and against the pressure of said gas in said chamber.

5. An internal ballistic engine comprising a casing, at least one pair of power means for intermittently providing internal pressure, output means for providing mechanical work, piston means connected to said power means, said piston means providing surfaces onto which the internal pressure of said power means operates, said piston means being independent of said output means and therefore capable fo being ballistically accelerated during a power stroke by the internal pressure of either of said power means with respect to said output means, whereby a portion of the internal energy of the power means, in the power stroke, is quickly converted into kinetic energy which is imparted onto said piston means, thereby lowering the internal temperature and pressure for lowering the rate of heat loss of the said power means, energy accumulator and convertor means in tandem with the power means, which is undergoing the power stroke, to which the kinetic energy of the ballistic pistons is imparted as potential energy, and torque producing means, connected between said energy accumulator and convertor means and said output means for converting the potential energy into output torque at said output means, said power means comprises at least one cylinder and a piston movable in said cylinder, said piston being connected to said torque producing means.

6. A ballistic engine according to claim 5 wherein said torque producing means comprises an angular energy accumulation drum, a central shaft rotatably connected to said drum, an inner rotor coaxially surrounding said shaft, at least one inner radial piston extending radially outwardly from said inner rotor in said drum, at least one outer radial piston extending radially inwardly from said drum to said rotor, said inner and outer radial piston and a portion of said energy accumulating drum defining an energy accumulation chamber having a compressible gas therein, said energy accumulating drum being connected to said output means to move said output means when said inner radial piston is moved toward said outer radial piston through the action of internal pressure, generated by said power means.

7. An internal ballistic engine according to claim 6 including a fixed housing, an overriding clutch connected between said inner rotor and said housing of the engine for engaging said shaft with said stationary housing when said shaft is urged to rotate in the reverse rotational direction and to disengage the stationary housing from said inner rotor when said inner rotor is urged in the forward rotational direction.

8. A ballistic engine according to claim 7 wherein said inner rotor of said energy accumulating drum includes a pawl and ratchet means for holding said inner radial piston during a predetermined time interval against pressure of the compressible gas in said energy accumulation chamber due to the proximity of said outer radial piston urging said rotor to rotate in the forward rotational direction, and pawl release means at a time instant which will result in an optimum compression ratio.

9. A ballistic engine according to claim 8 wherein said output means comprises an output shaft, a first gear connected to said output shaft, a second gear connected to said energy accumulating drum and engaged with said first gear for rotation of said output shaft when said energy accumulating drum is rotated by its connection with said reciprocal piston and through the action of the compressiable gas within said energy accumulation chamber.

10. An internal ballistic engine comprising a casing, at least one pair of power means for intermittently providing internal pressure, output means for providing mechanical work, piston means connected to said power means, said piston means providing surfaces onto which the internal pressure of said power means operates, said piston means being independent of said output means and therefore capable of being ballistically accelerated during power stroke by the internal pressure of either of said power means with respect to said output means, whereby a portion of the internal energy of the power means, in the power stroke is quickly converted into kinetic energy which is imparted onto said piston means, thereby lowering the internal temperature and pressure for lowering the rate of heat loss of said power means, energy accumulator and convertor means in tandem with the power means, which is undergoing the power stroke, to which the kinetic energy of the ballistic pistons is imparted as potential energy, and torque producing means, connected between said energy accumulator and converter means and said output means for converting the potential energy into output torque at said output means, said power means comprises a rotary engine having an output shaft, at least one constant speed drum connected to said output shaft, and an inner rotor rotatable about said output shaft and within said constant speed drum, at least one first radial piston extending radially outwardly from said inner rotor to said constant speed drum, at least one first outer radial piston extending inwardly from said constant speed drum toward said inner rotor, said first inner and outer radial pistons defining a combustion chamber therebetween, and differential means connected between said inner rotor and said constant speed drum for imparting rotation to said output shaft when said inner rotor is powered with respect to said constant speed drum by combustion in said combustion chamber.

11. A ballistic engine according to claim 10 wherein said torque producing means comprises an energy storage piston connected to said inner rotor, said energy accumulator and converter means comprising an energy storage drum disposed about said energy storage piston and stationary with respect thereto, said energy storage piston including at least one second inner radial piston extending toward said energy storage drum, at least one second outer radial piston extending inwardly from said energy storage drum to said energy storage piston, said second inner and outer radial pistons and a portion of said energy storage drum defining an energy accumulation chamber having a compressible gas therein, said chamber and gas comprising the energy accumulator and convertor means operably converting the kinetic energy imparted onto the inner piston by said power means into potential energy stored in said energy accumulator and convertor means.

12. A ballistic engine according to claim 11 including an overriding clutch connected between said inner rotor and said energy storage piston for engagement of said inner rotor with said energy storage piston when said inner rotor is powered by combustion in said combustion chamber and subsequently the potential energy in said energy accumulation chamber is converted to kinetic energy of the inner rotor by the expansion of said compressible gas within said energy accumulation chamber.

13. A ballistic engine according to claim 12 further including a pawl and ratchet means connected between said energy storage drum and said inner rotor to momentarily hold said second inner radial piston from rotating in the forward direction.

14. An internal ballistic engine comprising a casing, at least one pair of power means for intermittently providing internal pressure, output means for providing mechanical work, piston means connected to said power means, said piston means providing surfaces onto which the internal pressure of said power means operates, said piston means being independent of said output means and therefore capable of being ballistically accelerated during a power stroke by the internal pressure of either of said power means with respect to said output means, whereby a portion of the internal energy of the power means, in the power stroke, is quickly converted into kinetic energy which is imparted onto said piston means, thereby lowering the internal temperature and pressure for lowering the rate of heat loss of said power means, energy accumulator and converter means in tandem with the power means, which is undergoing the power stroke, to which the kinetic energy of the ballistic pistons is imparted as potential energy, and torque producing means, connected between said energy accumulator and convertor means and said output means for converting the potential energy into output torque at said output means and wherein said output means comprises an output shaft, an upper constant speed drum connected to said output shaft, a lower constant speed drum connected to said shaft, an upper inner rotor rotatable in said upper constant speed drum, differential interlinkage means connected between said upper and lower rotors and said output shaft, at least two inner radial pistons extending outwardly from said upper and lower inner rotors respectively to said upper and lower constant speed drums, at least two outer radial pistons extending inwardly from said upper and lower constant speed drums respectively and toward said upper and lower inner rotors and interleaved between said inner radial pistons, and said radial pistons and a portion of said constant speed drums defining upper and lower combustion chambers.

15. A ballistic engine according to claim 14 wherein said interlinkage means further comprises an upper plate connected to and radially extending from said output shaft between said upper and lower constant speed drums and a lower plate spaced from said upper plate and connected to and radially extending from said output shaft between said upper and lower constant speed drums, at least one first planetary gear mounted for rotation between said upper constant speed drum and said lower plate, at least one lower planetary gear mounted for rotation between said upper plate and said lower constant speed drum and engaged with said upper planetary gear in the area between said upper and lower plates, an upper torque gear connected to said upper inner rotor and engaged with said upper planetary gear, and a lower torque gear connected through said lower inner rotor and engaged with said lower planetary gear.

16. A ballistic engine according to claim 15 wherein said torque producing means comprises upper and lower energy storage pistons connected to said upper and lower inner rotors, upper and lower energy storage drums disposed about said upper and lower energy storage pistons and stationary with respect thereto, at least one outer radial member extending from said energy storage drum toward said energy storage piston, said outer radial member said energy storage piston and a portion of said energy storage drum defining an energy accumulation chamber having a compressible gas therein, said chamber and said gas comprising said energy accumulation and conversion means.

17. A ballistic engine according to claim 16 further including an upper and lower overriding clutch connected between said upper and lower energy storage pistons and said upper and lower inner rotors respectively for engagement between said energy storage pistons and said inner rotors when said inner rotors are powered by combustion in said combustion chambers and subsequently the potential energy is converted to kinetic energy when the compressible gas in said energy accumulation chamber expands.

18. A ballistic engine according to claim 17 further including upper and lower pawl and ratchet means connected between said upper and lower inner rotors and stationary housing of the engine.

* * * * *